FIG. 1
PRIOR ART
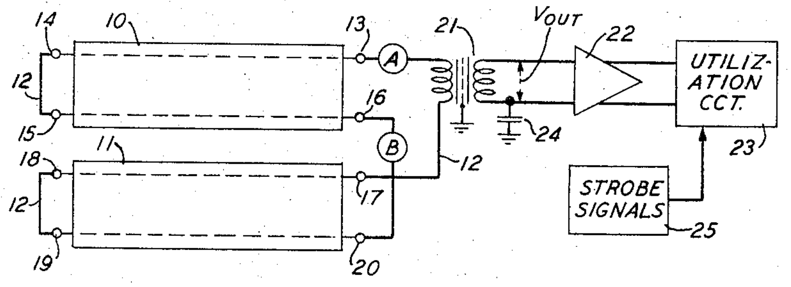
FIG. 1A
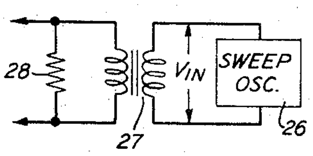
FIG. 2A FIG. 2B
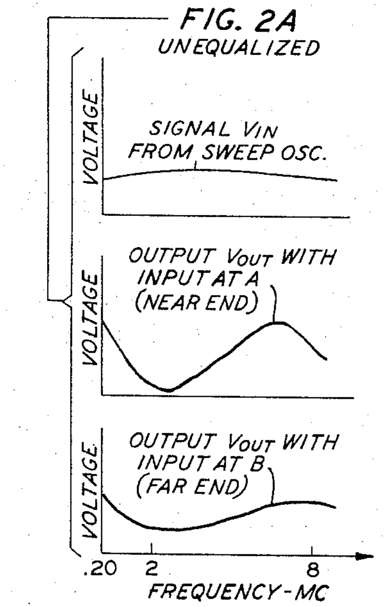
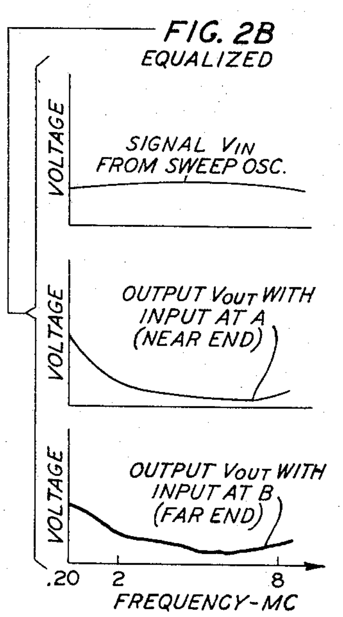
INVENTORS P. A. HARDING
E. H. SIEGEL, JR.
BY
Charles Scott Phelan
ATTORNEY

ELECTRIC CIRCUIT EQUALIZATION MEANS

Filed Jan. 10, 1963 3 Sheets-Sheet 2

ELECTRIC CIRCUIT EQUALIZATION MEANS

Filed Jan. 10, 1963 3 Sheets-Sheet 3

United States Patent Office 3,339,187

Patented Aug. 29, 1967

3,339,187
ELECTRIC CIRCUIT EQUALIZATION MEANS

Philip A. Harding, Middletown, and Eugene H. Siegel, Jr., Middletown Township, Monmouth, N.J., assignors to Bell Telephone Laboratories, Incorporated, New York, N.Y., a corporation of New York Filed Jan. 10, 1963, Ser. No. 250,559
11 Claims. (Cl. 340—174)

This invention relates to an equalizing circuit and, more particularly, it relates to a circuit for equalizing the read-out sensing circuit of a magnetic memory.

In the present state of the magnetic memory art it is known that bistable magnetic devices of a variety of types may be organized in matrix arrays to store binary-coded information bits. Each magnetic device is characterized by a substantially rectangular hysteresis loop characteristic defining two stable states of remanent magnetic flux. The device is switchable between these states by the application of a magnetomotive force of coercive field intensity and of appropriate polarity. When the device is switched by such a force, it generates electric signals in circuits coupled thereto. In a magnetic memory matrix array the electric circuit linking a group of bistable devices in the array for receiving such signals is designated the memory sensing circuit.

In a memory system the binary ONE and binary ZERO code bits are normally represented in the sensing circuit by electric pulse signals of different amplitudes, and a pulse amplifier discriminator is coupled through a preamplifier to the sensing circuit output for indicating the nature of any particular information bit signal which appears in the sensing circuit. However, it is also known that the signals developed in the sensing circuit of a magnetic memory differ in configuration as a function of the electrical distance from the point at which the signal was induced in the sensing circuit to the point at which the preamplifier input for the sensing circuit is located. This latter difference is believed to be due to the fact that the sensing circuit has, at the frequencies contained within the signal spectrum, certain transmission line characteristics such as inductance, resistance, and shunt impedance to ground and to other circuits. Consequently, it is entirely possible that a binary ONE signal that is generated in a remote location of the memory array may, when it reaches the input to the sensing amplifier, be virtually indistinguishable from a binary ZERO signal that is generated at a memory location that is close to the sensing amplifier input. Such a situation naturally makes the amplitude discriminating job difficult and results in the production of numerous errors in the discriminator output.

There is still another difficulty resulting from the fact that sensing circuit voltages differ in configuration depending upon the location at which they were produced. Some noise cancellation schemes rely upon noise pulses at different locations canceling each other. However, in certain magnetic memory systems it happens that much of the noise coupled to the sensing circuit has principal frequency components in ranges affected by the transmission line characteristics of the circuit. Consequently, noice voltages induced by similar functions in different parts of the sensing circuit are subjected to different transmission line lengths and have correspondingly different voltage amplitudes at the sensing circuit output. In such systems, the noise cancellation schemes lose a large measure of their utility. There is, thus, a considerable need for equalization in the sensing circuits of magnetic memories.

Conventional equalizing network techniques are not conveniently applicable to magnetic memory systems because the networks consume an excessive amount of power. Furthermore, resistive networks utilized to equalize amplitude distortion cannot correct phase distortion. One solution heretofore utilized as a substitute for equalization has been to refine the design of the discriminator circuits so that they will be able to discriminate between binary ONE and ZERO signals which may have similar amplitudes. Another solution is to keep the memory information bit content small so that the sensing circuit length is kept small enough to minimize the mentioned problems in unequalized circuits. However, both of these solutions involve considerable expense.

It is, therefore, one object of the present invention to equalize magnetic memory sensing circuits.

Another object is to modify magnetic memory sensing circuits so that similar signals generated in different memory locations will, at the sensing circuit output, have similar configurations.

A further object of the invention is to equalize magnetic memory sensing circuits so that any given signal generated at a given location in the memory will have substantially the same configuration in the memory output circuit regardless of the signal frequency spectrum.

These and other objects of the invention are realized in one illustrative embodiment wherein voltages induced in a sensing circuit of a magnetic memory matrix array include energy components over a broad range of frequencies which are affected by transmission line characteristics of the circuit. Within each sensing circuit at least two points which are significantly electrically separated from one another are coupled to a common output preamplifier and the coupling means utilized fort his purpose are also coupled to one another.

It is one feature of the invention that the intercoupling of different parts of a memory sensing circuit to the same utilization circuit and to one another produces more uniform sensing read-out results over the operating frequency band of the memory.

Another feature of the intercoupling of different parts of a memory sensing circuit to a common utilization circuit and to one another is that far-end and near-end responses of the circuit are very nearly equalized.

A further feature of one embodiment is that one part of a sensing circuit is utilized as an equalizing impedance network with respect to another part of the same circuit so that no separate equalizing network need be added beyond the coupling network utilized for interconnecting the sensing circuit parts to one another and to the utilization circuit.

Still another feature of the invention is that the intercoupling of different parts of a memory sensing circuit to the same utilization circuit produces both phase and amplitude equalization in the sensing circuit output.

Additional details of certain specific embodiments of the invention are set forth in the detailed description and the appended claims which follow. The description illustrates the manner in which the invention may be implemented, as well as illustrating and suggesting various objects, features, and advantages of the invention; and it may be considered in connection with the attached drawing in which:

FIG. 1 is a simplified schematic diagram illustrating a typical prior art sensing circuit for a magnetic memory;

FIG. 1A is a schematic diagram of a signal generating circuit utilized to produce amplitude-versus-frequency response characteristics for circuits discussed herein;

FIGS. 2A and 2B illustrate amplitude-versus-frequency response characteristics for the circuit of FIG. 1, and for circuits equalized in accordance with the present invention, respectively;

Figure 3:
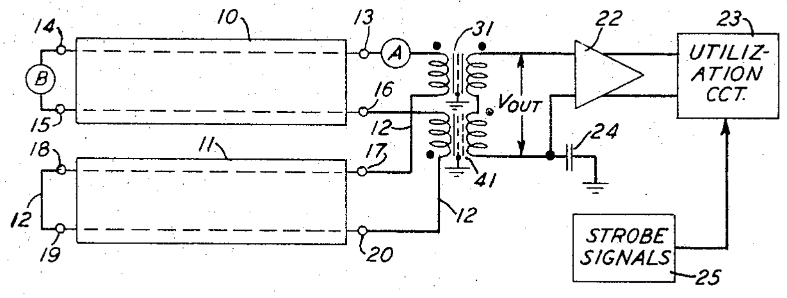
FIG. 3 is a simplified schematic diagram of one embodiment of the present invention.

In FIG. 1 two magnetic memory submodules 10 and 11 are shown with a sensing circuit 12 woven therethrough in a manner which is now known in the art. The copending application of P. A. Harding Ser. No. 179,870, which was filed Mar. 15, 1962, disclosed an advantageous form of such a memory arrangement. Sensing circuit 12 may be considered as being divided into a plurality of circuit sections defined by terminals 13, 14, 15, 16, 17, 18, 19, and 20. Each section is electromagnetically linked to a different group of bistable magnetic devices, not shown, for storing binary-coded information bits. Each device has a rectangular hysteresis characteristic defining two stable states of remanent flux between which the device may be switched by the application of a magnetomotive force of appropriate polarity and magnitude. The memory submodules in FIG. 1 also include appropriate drive circuits for coincident current operation as described in the mentioned Harding application, but these are not shown in FIG. 1.

All of the sections of the sensing circuit 12 are connected in series to form a single circuit that is connected between the terminals of the primary winding of a transformer 21. Upper terminals 13 and 17 of the two submodules 10 and 11 are connected to opposite terminals on the primary winding of transformer 21 to indicate schematically the arrangement of the two submodule parts of sensing circuit 12 in opposite sense for cancellation of noise voltages in different parts of the memory array in a manner known in the art. The circled A and B representations in sensing circuit 12 may be, for the present, considered to be simply short-circuit connections included in series with sensing circuit 12. These representations simply designate test points in the circuit to which connections may be made in a manner which will be subsequently described. The secondary winding of transformer 21 is applied to the input connections of a sensing circuit preamplifier 22 which couples signals to the input of a suitable utilization circuit 23. The latter circuit may, for example, comprise the discriminator circuit for a magnetic memory system. The circuit 23 is advantageously strobed by signals from a source 25, which is a clock source for the system utilizing the illustrated memory, to sample the output of preamplifier 22. One side of the secondary winding of transformer 21 is connected to ground through a capacitor 24 that represents schematically the alternating-current ground in the power supply for preamplifier 22. This ground is not essential to the operation of the invention.

The frequency response characteristics of sensing circuit 12 in the memory modules 10 and 11 may be obtained by utilizing a signal generating circuit illustrated in FIG. 1A. This circuit includes a sweep frequency oscillator 26 for producing at its output signals of different frequencies over a wide range of frequencies of interest and with oscillation amplitude of $V_{IN}$ volts. The oscillation voltages $V_{IN}$ are coupled by a transformer 27 to the terminals of a resistor 28. Potentials developed across resistor 28 may be caused to appear in series in sensing circuit 12 of FIG. 1 by opening that circuit, for example, at one of the points A or B, and connecting resistor 28 in series therein.

The input test signals to a circuit from oscillator 26 are shown in wave diagram form in FIG. 2A on the line designated "Signal $V_{IN}$ From Sweep Osc." A common frequency scale is used for all diagrams of FIGS. 2A and 2B. The $V_{IN}$ diagram in FIG. 2A covers a frequency range beginning at approximately .20 megacycle and extending upwards to above 8 megacycles; and the line in that diagram, as in all diagrams of FIGS. 2A and 2B, represents oscillation positive peaks at the various frequencies. For a typical magnetic memory system such as one utilizing the storage devices formed by one type of apertured ferrite sheets in a manner known in the art, the entire frequency range of interest is that between about twenty kilocycles per second and eight megacycles per second. However, frequencies below about two megacycles per second are not appreciably differently affected by the transmission line effects over different lengths of the sensing circuit.

If the test signal generator of FIG. 1A has its output resistor 28 connected in series in sensing circuit 12 of FIG. 1 at the circuit point A therein, there appears across the secondary winding of transformer 21 an output voltage $V_{OUT}$ which is also shown in FIG. 2A over the two to eight megacycle band which is here of primary interest. This diagram of $V_{OUT}$ with input at A represents near-end response for the sensing circuit of FIG. 1. The shape of this output voltage response has two distinctive characteristics. First of all, it has a very low amplitude portion just above two megacycles; and it has an extremely high amplitude portion just below eight megacycles, with the signal amplitude tapering off at, and above, eight megacycles.

If, now, the test signal generator output is shifted from point A to point B in sensing circuit 12, and operated over its full band of frequencies, the output voltage $V_{OUT}$ appearing across the secondary winding of transformer 21 has the configuration over the band of interest which appears in the lower diagram of FIG. 2A. It can be seen in this latter diagram that the peak and valley in the response characteristic are much less pronounced than they were in the preceding case when the test signal was applied at circuit point A. However, the peak and valley are, nevertheless, present; and there are also very clear differences between the $V_{OUT}$ signals that are produced by test signals at any given frequency when applied at the points A and B, respectively.

It is thus clear from FIG. 2A that in the unequalized sensing circuit of FIG. 1 a given binary-coded information bit may have substantially different amplitudes in the secondary circuit of transformer 21. These differences depend upon the frequency spectrum of the bit and upon the particular memory location from which the bit is produced. Thus, if a binary ONE were stored at a memory location which is very close to the point A in the sensing circuit 12, this ONE would appear in the secondary winding of transformer 21 with a different amplitude and phase than a binary ONE stored at a memory location close to the point B. The voltage-versus-frequency diagrams in FIG. 2B indicate the improvement that can be realized by equalization in accordance with the present invention, and the comparison of the wave diagrams of FIGS. 2A and 2B will be further discussed subsequently.

FIG. 3 includes a schematic diagram in simplified form of one embodiment of the present invention. In FIG. 3, as in other figures of the drawing, circuit elements and devices are designated by reference characters which are the same as those used in FIG. 1 for corresponding elements and devices. The transformer 21 of FIG. 1 is in FIG. 3 replaced by two transformers 31 and 41. The primary windings of the latter two transformers are connected to sensing circuit 12 at different points thereof. In this case they are connected at points which are as electrically remote from one another as possible. Thus, the primary winding of transformer 31 is connected to sensing circuit terminals 13 and 17, the same as the primary winding of transformer 21 in FIG. 1. However, the primary winding of transformer 41 is connected between terminals 16 and 20 in series in sensing circuit 12. Thus, sensing circuit 12 is now connected in a large closed loop circuit with the primary windings of transformers 31 and 41 connected in series therein at loop points which are electrically separated from one another. In this specific case it might be said that those points are electrically diametrically opposite from one another. In terms of the FIG. 1 circuit it might, therefore, be said that transformer 31 receives near-end signals in the loop of sensing circuit 12, while transformer 41 receives far-end signals.

The secondary windings of transformers 31 and 41 are connected in series with one another across the input to sensing preamplifier 22; and, as before, the sensing voltage $V_{OUT}$ is ascertained across that input. Thus, each secondary winding is loaded by the preamplifier 22 and the sensing circuit output impedance reflected into the other secondary winding. In addition, a signal generated at any location along sensing circuit 12 is coupled through different combinations of the sensing circuit portions and the two transformers to preamplifier 22. Winding polarity dots have been shown in FIG. 3 at the windings of transformers 31 and 41 to indicate that the secondary windings are connected in series-aiding relationship for signals generated at any location in circuit 12.

In FIG. 3 the sensing circuit point B has been moved from its previous location between circuit terminals 16 and 20 to a new location between terminals 14 and 15 in order that it may still be at the most remote circuit point possible with respect to the input the preamplifier 22 and the near-end circuit point A. The test signal generator of FIG. 1A is now placed in series in the sensing circuit at the point A and thereafter at the new point B location to obtain the near-end and far-end frequency response characteristics of the sensing circuit. The results of these test signal response determinations are illustrated in FIG. 2B. It is apparent now that, compared to the FIG. 2A response, the FIG. 2B response for point A in FIG. 3 is relatively uniform over the upper part of the band of interest, which part extends from about two to eight megacycles. This upper part is the region in which is found most of the energy content of noise pulses that are to be canceled. Similarly, the frequency response for signals applied at point B is also relatively uniform in FIG. 2B as compared to the response obtained and illustrated in the corresponding diagram of FIG. 2A. In addition, in the frequency range from twenty kilocycles to eight megacycles the frequency response magnitude differences are relatively insignificant when comparing the response to signals applied at point A with the response to signals applied at point B in FIG. 3.

There are, thus, two conclusions which are possible upon considering the response wave diagrams of FIGS. 2A and 2B. First of all, in FIG. 3 a signal induced in the sensing circuit at any particular location within the memory modules 10 and 11 appears with substantially the same amplitude at the input to preamplifier 22. Secondly, the more uniform response in the upper frequency range, i.e., above two megacycles, enables control and cancellation of unpredictable high frequency noise pulses. In one practical magnetic memory system it was found that by utilizing the equalizing coupling arrangement in accordance with the invention, and illustrated in FIG. 3, the $V_{OUT}$ signal-to-noise ratio was improved over the embodiment illustrated in FIG. 1 by a factor of about two. Furthermore, it has also been found that the circuit of FIG. 3 has substantially less variable delay than does the circuit of FIG. 1 so that output from the FIG. 3 embodiment has much less phase jitter among bits than does the circuit of FIG. 1.

It is apparent in FIG. 2B that in the range between about two and eight megacycles per second, the voltages induced in the sensing circuit 12 are of lower amplitude than the corresponding voltages in FIG. 2A. This demonstrates a substantial noise reduction because the principal noise frequencies lie in that range. However, the binary ONE signal voltages are not seriously hurt by the equalizing arrangement described because the bulk of their energy is represented by frequencies below two megacycles. In addition the ONES derive a direct benefit from the equalization because of the delay correction which reduces phase jitter among ONE signals generated at different memory locations. This latter factor facilitates strobing operations commonly employed in memory systems for sampling signals in the sensing circuits thereof.

Figure 4:
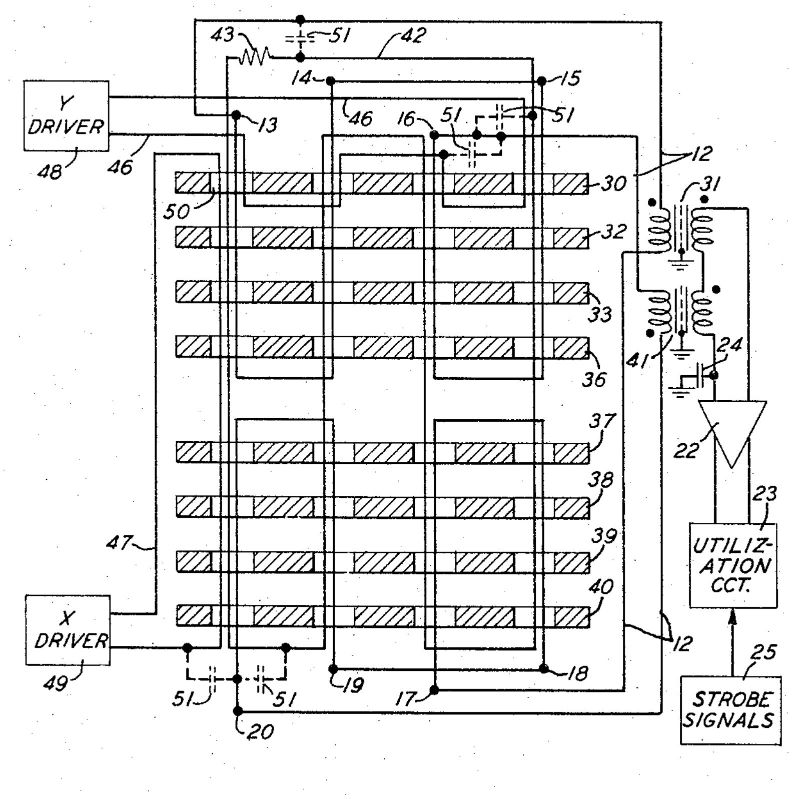
FIG. 4 is a more elaborate schematic diagram of the embodiment represented in FIG. 3.

FIG. 4 illustrates additional schematic detail of the embodiment of FIG. 3 as applied to a magnetic memory system utilizing apertures ferrite sheets of a type known in the art. The sheets illustrated in FIG. 4 are shown in a cross section taken through memory submodules 10 and 11 in a single simplified digit plane of the memory. Eight ferrite sheets are shown. These are the sheets 30, 32, 33, and 36 in submodule 10, and sheets 37, 38, 39, and 40 in submodule 11.

In addition to the sensing circuit 12 shown in FIG. 4 there is an inhibit circuit 42 which links all of the apertures in the digit plane illustrated there for submodules 10 and 11. The linkage of inhibit circuit 42 through the apertures of the eight illustrated ferrite sheets forms a loop circuit that is completed by a resistor 43 which schematically represents the output impedance of an inhibit circuit current driver (not shown). Such an inhibit driver normally supplies current pulses to inhibit circuit 42 during write-in operations of the memory in order to write a binary ZERO in a memory location selected by actuation of particular matrix coordinate address drive circuits in a manner well known in the art. Such coordinate address circuits are represented in FIG. 4 by the Y drive circuit 46 and the X drive circuit 47. Circuit 46 supplies drive current pulses from a Y circuit current driver 48 to the apertures of ferrite sheet 30. Similarly, an X current driver 49 supplies current pulses to the apertures in the column linked by the X circuit 47. The coincidence of drive pulses in the illustrated X and Y circuits selects for actuation the extreme left-hand aperture 50 of sheet 30. Y circuit 46 links all of the other apertures in sheet 30 which are not shown by the sectional view in FIG. 4, and in a similar manner X circuit 47 links all of the column apertures in the two submodules in a plane which is perpendicular to the plane in the drawing. Other Y circuits would be provided to link apertures in other planes of the illustrated submodules, but they are not shown in FIG. 4 because they do not comprise directly a part of the present invention. In a similar manner, other X circuits not shown link the column apertures in planes parallel to the plane of the aforementioned apertures linked by X circuit 47.

A plurality of capacitors 51 are shown as connected by broken line leads between different parts of the sense circuit 12 and ground and the inhibit circuit 42, Y circuit 46 and X circuit 47. These capacitors represent the spurious distributed capacitive coupling to the sensing circuit from the inhibit circuit and from the other drive circuits which follow paths which are at least partially concurrent with the path of the sense circuit through the memory. These spurious capacitors 51 become effective by virtue of the facts that the apertures in the ferrite sheets are so small that the drive circuit leads, which are insulated, are in actual physical contact with one another within the apertures and that the capacitive coupling among the drive and sensing circuits by virtue of the proximity of their respective leads to one another becomes significant at the high frequencies included within the binary signal energy spectrum. This capacitive coupling prevails along the entire length of concurrence of paths for the sensing circuit and any other circuit adjacent thereto. However, for purposes of convenient illustration, those distributed capacitive coupling effects are schematically represented by a few lumped capacitors 51. The significant fact to be noted with respect to this spurious capacitive coupling in FIG. 4 is that inhibit circuit 42 is thereby coupled to all portions of sensing circuit 12 in all of the sheet apertures of the illustrated digit plane. Spurious capacitive coupling is normally a detriment, but it has been found in accordance with the present invention that this spurious coupling can be turned to advantage. It can be usefully employed in a manner which is indicated in connection with the circuit diagram of FIG. 5, which is a partial equivalent circuit for the diagram of FIG. 4.

Figure 5:
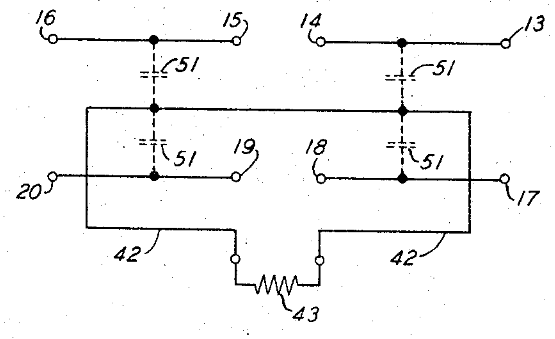
FIG. 5 is a partial equivalent circuit of the embodiment illustrated in FIGS. 3 and 4.

In FIG. 5 the various sections of sensing circuit 12 which are defined by the numbered terminals in FIG. 3 are set apart with no direct interconnections therebetween. Also shown in FIG. 5 is the inhibit circuit 42 and the spurious capacitive coupling between inhibit circuit 42 and the sections of sensing circuit 12 as indicated by capacitors 51. Thus, it can be seen in FIG. 5 that the various sections of sensing circuit 12 are all coupled together through the inhibit circuit 42 and the capacitive coupling between those sensing circuit sections and the inhibit circuit. It is believed at the present time that the symmetry of this common coupling arrangement among all the sections of the sensing circuit, through the inhibit circuit, contributes to the useful results produced by the present invention.

The arrangement in FIG. 5 can be represented somewhat differently to consider the sensing circuit portions there illustrated and the inhibit circuit 42 as a multiport network. This network is shown in diagrammatic form in FIG. 6 wherein each of the circuit portion terminals is considered to be a port of the network. The two ports represented by the inhibit circuit loop are interconnected by resistor 43. There remain in this network eight additional ports bearing the reference characters of the terminals of the sensing circuit portions. Each of these eight ports is internally directly connected through the network to only one other of the eight ports, and it is otherwise externally unconnected to and of the other ports. In addition, each of the eight remaining ports is internally coupled by the aforementioned capacitive coupling represented by capacitors 51 to the inhibit circuit 42.

Taking this multiport viewpoint, the actual results indicated in FIG. 2B can be confirmed by known mathematical analytical techniques. It is first assumed that at least two pairs of sensing circuit terminals which are not directly connected in FIG. 5 are coupled to a common output circuit. It is next assumed that the remaining ones of the eight terminals are interconnected in any desired fashion to form of all of the parts of the sensing circuit 12 one or more loop circuits, each of which is coupled to the common output circuit. The analysis then shows that the near-end response in each such loop circuit is substantially the same as the far-end response thereof. This states in another form the results which were illustrated and discussed in connection with FIG. 2B. More than two circuit terminal pairs are coupled to the common output circuit in large systems wherein sufficient equalization does not result from coupling the two pairs of the illustrative embodiments herein.

Figure 6:
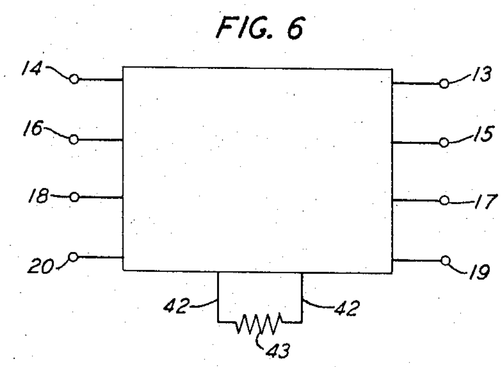
FIG. 6 is an alternate schematic representation of the circuit of FIG. 5.
Figure 7:
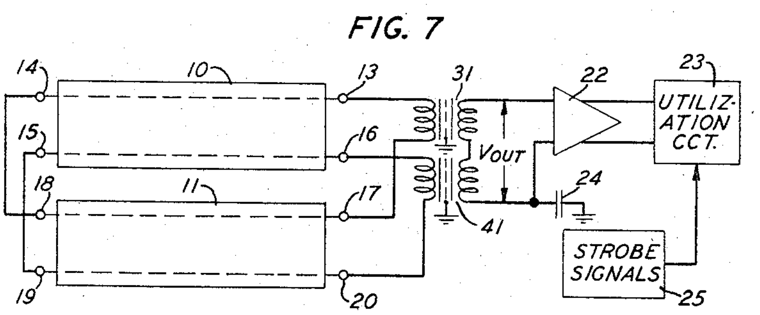
FIG. 7 is a simplified schematic diagram illustrating an additional embodiment of the invention.

Utilizing the concepts mentioned in connection with FIGS. 5 and 6, at least one additional embodiment of the present invention may be derived. This embodiment is illustrated schematically in FIG. 7 and includes the elements shown in FIGS. 3 and 4 with different sensing circuit portion interconnections. In accordance with the embodiment of FIG. 7, the sensing circuit 12 is arranged with its respective portions to form two separate loop circuits. One of these circuits is defined by the sensing circuit portions including terminals 13, 14, 18, and 17, and is connected to the primary winding of transformer 31. A second loop circuit is formed by the sensing circuit portions which include terminals 16, 15, 19, and 20 and is connected across the primary winding of transformer 41. The secondary windings of transformers 31 and 41 are connected in series across the input to preamplifier 22 as previously mentioned in connection with FIG. 3. Thus, two portions of the sensing circuit are coupled separately to the input circuit of preamplifier 22 and the coupling means are interconnected in that input circuit in the manner previously mentioned. This arrangement produces the same results illustrated in FIG. 2B. In this case one transformer couples to the input of preamplifier 22 the signal induced in the sensing circuit loop that is connected across its primary winding. The other transformer reflects into the input circuit of preamplifier 22 the impedance of another sensing circuit loop. It is believed that the last-mentioned impedance has an equalizing effect upon the desired signal. This impedance influence is further indicated by the absence of winding polarity dots for transformers 31 and 41 in FIG. 7. In that embodiment any winding polarities may be employed without substantial alternation of the beneficial results illustrated in FIG. 2B.

Although the present invention has been described in connection with particular applications and specific embodiments thereof, it is to be understood that additional modifications, embodiments, features, and advantages of the invention which will be apparent to those skilled in the art, and which utilize the underlying principles of the invention, are all included within the spirit and scope of the present invention.

What is claimed is:

1. In a magnetic memory having a plurality of storage devices and a sensing circuit for coupling signals generated at said devices in different parts of said memory to a utilization circuit, a plurality of transformers each having a primary winding and a secondary winding, each of said primary windings being connected in a series circuit with different parts of said sensing circuit connected on each side of each of said primary windings in said series circuit, each such sensing circuit part being coupled to different ones of said devices, and means connecting said secondary windings of said transformers in series with one another across said utilization circuit.

2. The magnetic memory in accordance with claim 1 wherein said sensing circuit parts are separate loop circuits, each of which includes the primary winding of a different one of said transformers.

3. The magnetic memory system in accordance with claim 1 in which said sensing circuit parts are connected in a single loop circuit with the primary windings of said transformers being connected in series therein at electrically separated points in said loop circuit.

4. The magnetic memory system in accordance with claim 1 in which said plurality of transformers includes two transformers, and said sensing circuit is connected in a single loop circuit with the primary windings of said transformers connected in series therein at electrically diametrically opposed points in said loop circuit.

5. A magnetic memory system comprising a plurality of bistable magnetic devices arranged in two matrix arrays comprising submodules of the memory system, a sensing circuit electromagnetically linking all of said devices and having in each of said submodules first and second circuit end terminals, two transformers each having a primary winding and a secondary winding, means connecting the first end terminals of the sensing circuit in both of said submodules to the terminals of one of said primary windings, means connecting the second end terminals of said sensing circuit in both of said submodules to the terminals of the other of said primary windings, a utilization circuit, and means connecting said secondary windings in series in a circuit connected to the input of said utilization means.

6. A magnetic memory system comprising a plurality of magnetic storage devices, a sensing circuit electromagnetically linking said devices, a utilization circuit, means coupling two terminals of said sensing circuit to said utilization circuit, means, exclusive of the last mentioned coupling means, directly coupling said utilization circuit to a point in said sensing circuit which is electrically remote from said two terminals, and means coupling each of said coupling means to load the other for substantially equalizing the near-end and far-end frequency responses in said sensing circuit with respect to said utilization circuit.

7. The magnetic memory in accordance with claim 6 in which an inhibiting circuit links said devices, and said sensing circuit and said inhibiting circuit are capacitively coupled to one another.

8. Electric circuit equalizing means comprising an electric circuit to be equalized, said circuit having at least first and second parts, a load, means coupling each of said parts to said load so that the electric circuit effect of each of said parts is represented in the net electric signal applied to said load from either of said parts, said coupling means comprising equalization means including two transformers, each having a primary winding and a secondary winding, means connecting opposite terminals of each of said primary windings to different ones of said parts, respectively, and means connecting said secondary windings in series-aiding relationship across said load.

9. A magnetic memory system comprising first and second groups of bistable magnetic storage devices, a sensing circuit linking the devices of said groups, a utilization circuit, means coupling the two parts of said sensing circuit which link said two groups of devices to said utilization circuit in opposite sense for the cancellation of noise voltages induced in said sensing circuit parts by similar noise sources, and means equalizing said sensing circuit to cause signals of similar type generated at different memory locations along said sensing circuit to have similar configuration and phase at the input to said utilization circuit, said equalizing means comprising mutual inductance means coupling each of said sensing circuit parts to said utilization circuit.

10. A magnetic memory system comprising a plurality of bistable magnetic storage devices, a sensing circuit linking said devices for conducting signal voltages of first and second types induced therein by said devices, said voltage types having substantially different frequency content with one having a principal energy frequency spectrum in a substantially lower frequency range than the principal energy frequency spectrum of the other, said sensing circuit having transmission line characteristics of delay and amplitude distortion for signals in said high frequency spectrum, a utilization circuit, and equalization means comprising two transformers coupling different parts of said sensing circuit which are linked to different ones of said devices to said utilization means for equalizing distortion in said signals coupled from different parts of said sensing circuit.

11. In a magnetic memory having a plurality of storage devices and a sensing circuit for coupling signals generated at said devices in different parts of said memory to a utilization circuit, said sensing circuit including parts connected in a plurality of separate loop circuits, said loop circuits being simultaneously electrically conductive, a plurality of transformers each having a primary winding and a secondary winding, each of said primary windings being connected in series in a different one of said loop circuits, each such sensing circuit part being coupled to different ones of said devices, and means connecting said secondary windings of said transformers in series with one another across said utilization circuit.

References Cited

UNITED STATES PATENTS

| | | | |
|---|---|---|---|
| 1,483,179 | 2/1924 | Jammer | 333—28 |
| 2,067,443 | 1/1937 | Gewertz | 333—28 |
| 3,040,303 | 6/1962 | James | 307—88 X |
| 3,098,157 | 7/1963 | Enomoto | 307—88 |
| 3,137,843 | 6/1964 | Gaunt | 340—174 |
| 3,142,049 | 7/1964 | Crawford | 340—174 |
| 3,144,641 | 8/1964 | Raffel | 340—174 |
| 3,170,147 | 2/1965 | Bartik | 340—174 |
| 3,218,616 | 11/1965 | Huijer | 340—174 |
| 3,231,871 | 1/1966 | Vinal. | |

BERNARD KONICK, *Primary Examiner.*

TERRELL W. FEARS, *Examiner.*

M. S. GITTES, *Assistant Examiner.*